United States Patent [19]

Papanicolaou

[11] Patent Number: 4,868,460
[45] Date of Patent: Sep. 19, 1989

[54] TRANSFORMER DIMMER CIRCUIT

[76] Inventor: E. S. Papanicolaou, 2317 Darnell Ct., San Jose, Calif. 95133

[21] Appl. No.: 140,534

[22] Filed: Jan. 4, 1988

[51] Int. Cl.$^4$ .......................................... H05B 37/00
[52] U.S. Cl. ............................... 315/200 R; 315/199; 315/206; 315/247
[58] Field of Search ................. 315/DIG. 4, 206, 247, 315/58, 200 R, 199, 291

[56] References Cited

U.S. PATENT DOCUMENTS

| | | | |
|---|---|---|---|
| 3,028,525 | 3/1962 | Morton | 315/272 |
| 3,215,891 | 10/1965 | Fritz | 315/50 |
| 3,715,623 | 2/1973 | Szabo | 315/194 |
| 3,836,814 | 9/1974 | Rodriquez | 315/51 |
| 4,334,171 | 6/1982 | Parman et al. | 315/DIG. 4 |
| 4,348,612 | 9/1982 | Morton | 315/58 |
| 4,540,917 | 9/1985 | Luchaco et al. | 315/291 |
| 4,570,107 | 2/1986 | Lee | 315/200 R |

OTHER PUBLICATIONS

Problems Encountered in Applying the Silicon-Controlled Rectifier to Control Tungsten Lamp Loads, C. S. Daugherty, IEEE (IRE) Transactions "Communication & Electronics", Sep. 1961, vol. 80, pp. 400-402.
"The Silicon Controlled Rectifier in Lamp Dimming & Heating Control Service", E. E. von Zastrow, Appl. Note 200.14 by General Electric. 6/65.

Primary Examiner—Donald J. Yusko
Assistant Examiner—Brian Palladino

[57] ABSTRACT

This invention is a circuit for controlling the power received by a load. The operation of this circuit is based on variations of voltage amplitude rather than phase as is the case with other circuits utilizing the phase control principle. A pair of terminals couple an AC service voltage source to a load and to a distributor switch by which an operator can arrange for the load to receive power directly from the AC service voltage source, or through a transformer and a gated switch, or through a diode. The operation, by way of the transformer and the gated switch or by way of the diode, provides not only "soft-start" and protection from power line transients (voltage spikes) to the load but also prevents it from emitting acoustical noise.

8 Claims, 2 Drawing Sheets

TRANSFORMER DIMMER CIRCUIT

BACKGROUND OF THE INVENTION

This invention relates to a circuit for controlling the power received by a load and more particularly to a light dimmer circuit for regulating the brightness of a lamp.

BRIEF DESCRIPTION OF THE PRIOR ART

Several systems were used in the past for controlling the brightness of lamps. One such system was the three-way light fixture commonly known as TRILITE. Although a very old design the TRILITE is still used nowdays very extensively. Dimming in the TRILITE is achieved by means of a double-filament lamp and a mechanical switch having four positions. These positions are commonly designated as OFF, LO, MED, and HI, and represent the four states of the lamp. With the switch in the OFF position the lamp is simply turned off. In switch positions LO, MED, and HI the lamp is set for low, medium, and high brightness levels respectively, due to power being applied to each lamp filament individually or to both lamp filaments at the same time.

Close inspection of the TRILITE and its operation reveals several deficiencies. An expensive double-filament electric lamp is utilized and if either filament is destroyed the lamp is no longer useable and must be discarded. The LO setting cannot provide low enough brightness comparable to a "nite-lite" lamp, and the MED setting is hardly used. Because of the sequential nature of the mechanical switch, if the lamp is set in the LO position, it cannot be turned off without stepping through the MED and HI settings, and this effect can be very undesirable in cases where high brightness levels cannot be tolerated before turning the lamp off. There is no provision for "soft-start" to avoid lamp "blow-out" at power up, nor any lamp protection against power line transients or voltage spikes.

Quite a number of attempts were made to improve the performance of the TRILITE by designing systems utilizing the phase control principle to regulate the power to the lamp load. Touch-control lamp systems fall in that category. The majority of these systems found no place in the industrial world and continue to remain novelty items, because first they did not address all the drawbacks of the TRILITE, and second they introduced new shortcomings. They made possible the use of a single-filament standard elecric lamp but did not resolve the sequential problem of the switch. A "soft-start" feature was introduced to some extent but high line transients would still cause lamp "blow-out" in which case the gated switch in series with the lamp may fail as well. A brightness feature comparable to that of a "nite-lite" lamp was introduced but nothing was done to prevent the lamp from emitting acoustical (audible) noise very undesirable in a relatively low ambient noise level environment such as that of a bedroom at night time.

OBJECTS AND SUMMARY OF THE INVENTION

One object of the present invention is to provide a circuit for controlling the power received by a load. Another object of the invention is to provide circuit means for electrically isolating a transformer, if not in use, to prevent it from interfering with the circuit operation. Another object of the invention is to introduce circuit means for providing "soft-start" to a load connected to receive power from a service voltage source. Another object of the invention is to introduce circuit means for providing protection from power line transients (voltage spikes) to a load receiving power from a service voltage source. Still another object of the invention is to provide circuit means for preventing acoustical noise to be emitted by a load receiving power from a service voltage source.

These and other objects, advantages and capabilities are achieved in one aspect of the invention by a transformer dimmer circuit. The operation of this dimmer circuit is based on variations of voltage amplitude rather than phase as is the case with other dimmer circuits utilizing the phase control principle. A pair of terminals couple an AC service voltage source to a load and to a distributor switch by which an operator can arrange for the load to receive power directly from the AC service voltage source, or through a transformer and a gated switch, or through a diode. The operation, by way of the transformer and the gated switch or by way of the diode, provides not only "soft-start" and protection from power line transients to the load but also prevents it from emitting acoustical noise.

DETAILED DESCRIPTION OF THE PREFERRED EMBODIMENT

Figure 1:
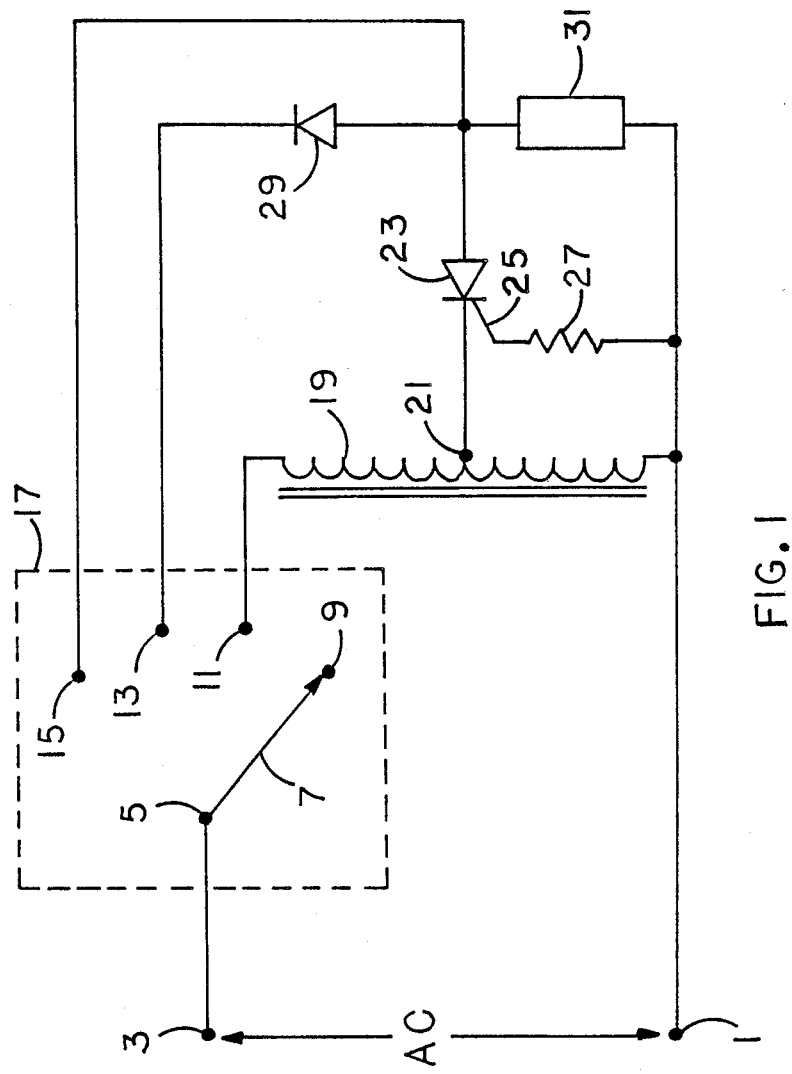
FIG. 1 is a detailed schematic diagram of a preferred embodiment of the present invention.

Referring to the drawings, FIG. 1 illustrates the preferred embodiment of the invention, a transformer dimmer circuit with a single-filament standard electric lamp as the load. A pair of terminals 1 and 3 couple an AC service voltage source to a lamp load 31 through the "voltage input" point 5 of a four-position, single-pole, rotary, and non-sequential distributor switch 17. If the wiper 7 of the distributor switch 17 is in setting 9 no power is transmitted from the AC service voltage source to the lamp load 31. With the wiper 7 of the distributor switch in setting 11 an autotransformer 19 is connected across the AC service voltage source. Autotransformer tap 21 is coupled to the lamp load 31 by way of a gated switch 23 such as an SCR or a TRIAC. Triggering of the gated switch 23 is achieved by using a resistor 27 to couple the side of the AC service voltage source at terminal 1 to the gate electrode 25 of the gated switch 23. When the wiper 7 of the distributor switch 17 is in setting 13 the AC service voltage source is coupled to the lamp load 31 by way of a diode 29. While the wiper 7 of the distributor switch 17 is in setting 15 the AC service voltage source is applied directly across the lamp load 31.

Figure 2:
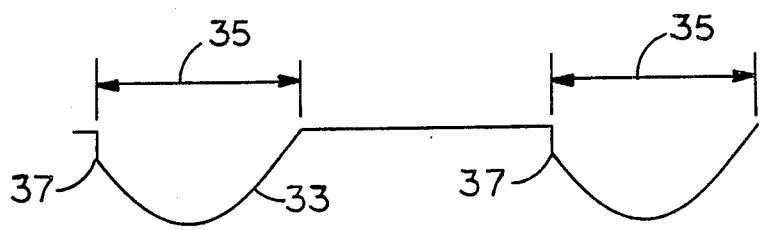
FIGS. 2 to 5 are load voltage waveforms illustrating the operation of the various portions of circuitry in FIG. 1.
Figure 3:
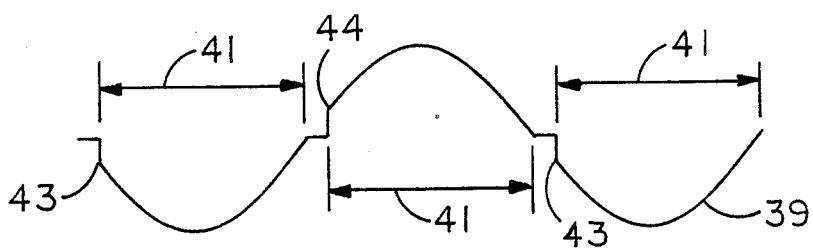

FIG. 2 depicts the voltage waveform 33 across the lamp load 31 if the wiper 7 of the distributor switch 17 is in setting 11 and the gated switch 23 is an SCR. This waveform 33 is close to being half-wave rectified due to the large conduction angle 35 as a result of the gated switch 23 being triggered early in the cycle at point 37. Also the amplitude of the waveform 33 is much lower than the corresponding amplitude of the AC service voltage source. Hence "soft-start" is provided to the lamp load 31 the brightness of which will be comparable to that of a "nite-lite" lamp. Furthermore if the conduction angle 35 is kept larger than 170 degrees no acoustical noise will be emitted by the lamp load 31. Also any transients in the AC service voltage source if slow enough to get through the autotransformer 19 will be transmitted with much lower amplitude and will be accommodated by the lamp load 31 running at much lower than rated power. Actually because of the orientation of the gated switch 23 only negative going transients will be allowed to reach the lamp load 31. If the gated switch 23 is a TRIAC the major difference in performance from the SCR case would be the brightness of the lamp load 31 being higher but still comparable to that of a "nite-lite" lamp. This time the load voltage waveform 39, as depicted in FIG. 3, is very close to being sinusoidal as a result of the gated switch 23 being triggered early in the cycle at points 43 and 44 to produce a large conduction angle 41 thus preventing any acoustical noise from being generated by the lamp load 31. The amplitude of the waveform 39 is again much lower than the corresponding amplitude of the AC service voltage source. Hence "soft-start" is again provided to the lamp load 31 and any transients in the AC service voltage source will be attenuated and absorbed by the lamp load 31 without causing any damage.

Figure 4:
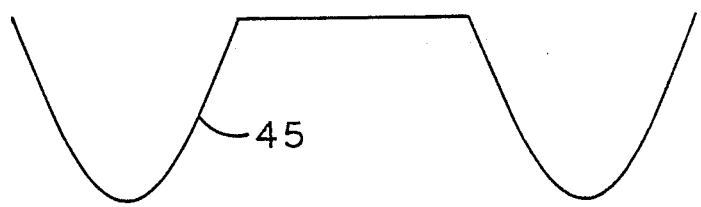

FIG. 4 shows the voltage waveform 45 across the lamp load 31 if the wiper 7 of the distributor switch 17 is in setting 13. This waveform 45 is half-wave rectified due to the diode 29 in series with the lamp load 31. Hence the lamp load 31 emits no acoustical noise and is also, because of the diode 29 orientation, protected from positive going transients in the AC service voltage source. Additional "soft-start" is also being provided to the lamp load 31 the brightness of which will be about ¼ of the maximum brightness this lamp load 31 can emit when operated at rated power. In this mode of operation the gated switch 23 cannot be triggered and is essentially in the off state thus preventing any rectified lamp load 31 currents from damaging the transformer 19.

Figure 5:
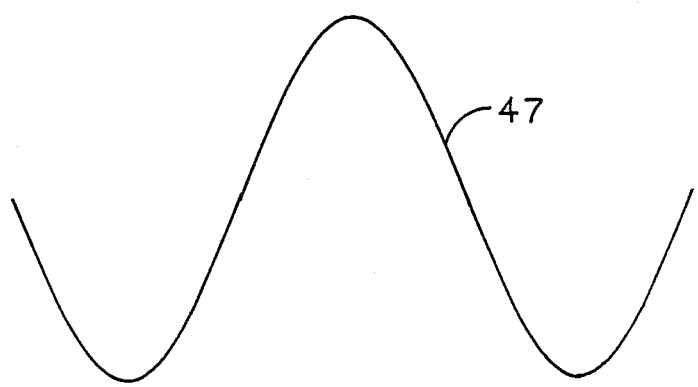

With the wiper 7 of the distributor switch 17 in setting 15 the AC service voltage source is applied directly across the lamp load 31. Hence the voltage waveform 47 across the lamp load 31, as depicted in FIG. 5, is essentially that of the AC service voltage source and the lamp load 31, operated at rated power, will be at full brightness. Triggering of the gated switch 23 is again not possible thus no currents from the AC service voltage source are allowed to reach the transformer 19 and generate hum.

While the preferred embodiment of this invention has been illustrated and described, changes, modifications, and substitutions can be made to the circuit without departing from the essential features defined and secured by the appended laims. For example a diode can be included in series with resistor 27 if for the gated switch 23 reverse gate power dissipation is not allowed. With the gated switch 23 being a TRIAC a diode in series with resistor 27 will make the TRIAC operate like an SCR. For a very sensitive gated switch 23 desensitization can be achieved by connecting a resistor between the gate electrode 25 of the gated switch 23 and autotransformer tap 21. Other trigger circuits like the RC type, very common in phase control systems, can be used for triggering the gated switch 23. Both the gated switch 23 and trigger resistor 27 can be omitted and their functions taken up by the distributor switch 17 if for example it is the double-pole type.

A dimmer circuit utiliziing a transformer at first may appear to be in a disadvantage if matched against other dimmer circuits smaller in size. However it must be kept in mind that adding inductance in the line was found to be the most realistic solution to the lamp noise problem, and if such inductance is included the size of any dimmer circuit can be increased considerably. Although somewhat large in size a transformer dimmer circuit can easily be accommodated inside light fixtures or table lamps with large bases. It may even be desirable to have a transformer dimmer circuit inside a table lamp base to give the lamp additional weight and to have the transformer also used as source to power other components that might be needed in future designs.

What is claimed is:

1. A circuit for controlling the power received by a single-filament (e.g. incandescent) lamp load comprising
a pair of terminals for connection to an AC service voltage source, including a distributor switch coupling one of said terminals to one side of a single-filament lamp load at least directly, or via a diode, or by way of a transformer providing, respectively, high, medium, and low power levels to said single-filament lamp load, wherein the other side of said single-filament lamp load is connected to the other of said terminals.

2. The circuit of claim 1 wherein said transformer input winding is shunted across said AC service voltage source via said distributor switch, one end of said transformer output winding connected to the other of said terminals, the other end of said tranformer output winding connected to one side of said single-filament lamp load via an ON/OFF switch enabling flow of current to said single-filament lamp load or isolating said tranformer output winding when not energized.

3. The circuit of claim 2 wherein said ON/OFF switch is a gated switch including a resistor coupling the gate electrode of said gated switch to the other of said terminals whereby enabling or preventing triggering of said gated switch.

4. Circuit means for isolating a transformer winding from an AC service voltage source comprising
a gated switch coupling one side of an AC service voltage source to one end of a transformer winding, the other end of said transformer winding coupled to the other side of said AC service voltage source, including a resistor coupling the gate electrode of said gated switch to the other side of said AC service voltage source whereby preventing triggering of said gated switch.

5. The circuit of claim 4 wherein one side of said AC service voltage source is coupled to said gated switch via a diode.

6. The circuit of claims 3 or 4 wherein said gated switch is an SCR.

7. The circuit of claims 3 or 4 wherein said gated switch is a TRIAC.

8. The circuit of claim 2 wherein said transformer output winding is a portion of said transformer input winding whereby making said transformer an autotransformer.

* * * * *